United States Patent [19]

Adlhoch et al.

[11] Patent Number: 4,578,226
[45] Date of Patent: Mar. 25, 1986

[54] VENTURI SCRUBBER FOR DUST-LADEN GASES

[75] Inventors: Wolfgang H. Adlhoch, Swisttal; Johannes Lambertz, Kerpen, both of Fed. Rep. of Germany

[73] Assignee: Rheinische Braunkohlenwerke AG, Fed. Rep. of Germany

[21] Appl. No.: 668,367

[22] PCT Filed: Jan. 19, 1984

[86] PCT No.: PCT/DE84/00013
§ 371 Date: Sep. 19, 1984
§ 102(e) Date: Sep. 19, 1984

[87] PCT Pub. No.: WO84/02856
PCT Pub. Date: Aug. 2, 1984

[30] Foreign Application Priority Data

Jan. 22, 1983 [DE] Fed. Rep. of Germany ....... 3302148

[51] Int. Cl.$^4$ .............................................. B01F 3/04
[52] U.S. Cl. ...................... 261/71; 261/112; 261/DIG. 54; 261/118
[58] Field of Search .............. 261/DIG. 54, 112, 118, 261/71

[56] References Cited

U.S. PATENT DOCUMENTS

| | | | |
|---|---|---|---|
| 1,307,665 | 6/1919 | Guider | 261/63 |
| 1,741,519 | 12/1929 | Huff | 261/DIG. 54 |
| 2,684,836 | 7/1954 | Arborgh et al. | 261/DIG. 54 |
| 3,182,977 | 5/1965 | Erni | 261/DIG. 54 |
| 3,524,630 | 8/1970 | Marion | 261/DIG. 54 |
| 3,567,194 | 3/1971 | Shah et al. | 261/DIG. 54 |
| 3,601,374 | 8/1971 | Wheeler | 261/DIG. 54 |
| 3,758,081 | 9/1973 | Prudhon | 261/DIG. 54 |
| 3,804,386 | 4/1974 | Arnold et al. | 261/DIG. 54 |
| 3,959,420 | 5/1976 | Geddes et al. | 261/DIG. 54 |

FOREIGN PATENT DOCUMENTS

| | | | |
|---|---|---|---|
| 1213375 | 3/1960 | France . | |
| 2452311 | 10/1980 | France | 261/DIG. 54 |
| 830858 | 3/1960 | United Kingdom . | |

Primary Examiner—Tim Miles
Attorney, Agent, or Firm—Seidel, Gonda, Goldhammer & Abbott

[57] ABSTRACT

The invention relates to a venturi scrubber for dust-laden gases, includes an intake portion (1) whose duct (8) through which the gas flows progressively reduces in size in the direction of flow (5, 6), and a ring duct (13) for a fluid, which is disposed at the largest-diameter end (12) of the intake portion (1) and which is connected over its entire periphery to the duct (13) of the intake portion (1), through which the gas flows, wherein at least one feed conduit (17) for the fluid opens substantially tangentially into the ring duct (13). The duct (13) which is under an increased pressure is connected by way of a through-flow gap (27) to the duct (8) of the intake portion (1), through which the gas flows. The flow gap (27) is so formed and arranged that the fluid issues substantially parallel to the adjoining region of the wall (7) of the duct (8), along said wall. That provides that a thin, uniform film of fluid flows over the wall (7) of the duct (8), and prevents any deposited solid particles from sticking to and caking on the wall (7).

8 Claims, 4 Drawing Figures

VENTURI SCRUBBER FOR DUST-LADEN GASES

The invention relates to a venturi scrubber for dust-laden flowing gases, comprising an intake portion whose duct through which the gas flows is of a cross-section that progressively decreases in the flow direction, and an annular duct for a fluid, which annular duct is arranged adjacent the largest-diameter end of the intake portion and is connected over its entire periphery to the inlet portion duct through which the gas flows, wherein at least one feed conduit for the fluid opens into the annular duct in such a way that the fluid flows into the annular duct with a tangential component.

Venturi scrubbers of that kind generally comprise three portions, namely an intake portion, a central portion and a diffuser. By virtue of the cross-section of the intake portion decreasing in the direction of flow, the speed of the gas flowing therein is increased. The wall of the intake portion is formed on the lines of a venturi pipe or, for the sake of simplicity, is internally of a conical configuration. The central portion which adjoins the intake portion is of the narrowest cross-section so that the gas speed there is at its greatest. At that point, a fluid, normally water, is sprayed into the free cross-section of the central portion; the fluid is broken up into very fine droplets by the high-speed gas flow and is entrained therein. In particular by virtue of the difference in speed between the droplets of fluid and the solid particles to be removed in the gas flow, the solid particles are deposited on the droplets of water. In the diffuser-shaped enlarged portion downstream of the central portion, the speed of the gas flow falls again. The pressure drop which occurs when the gas flows through the narrowest part is partially recovered when that happens. The gas-water-solid mix is then passed through a suitable piece of apparatus, for example a cyclone, within which the dust-laden droplets of water are separated out of the gas flow, thus producing a gas of the desired degree of cleanliness. The water used for causing the dust to be deposited on the water droplets can be recycled a number of times. The step of separating the dust from the water is advantageously carried out in a sedimentation tank.

The operation of injecting the water required for separation of the solid particles is generally effected, as considered in the direction of flow, at the beginning of the narrowest cross-section in the central portion. The gas speed is at its highest at that point so that the water introduced is accordingly broken up into particularly fine droplets.

Difficulties are frequently encountered by virtue of the fact that solid particles are deposited on the inside wall surface of the venturi scrubber, in particular in the intake portion thereof, upstream of the point, in the direction of flow, at which the water is injected into the unit. The resulting deposits of solid matter grow in opposition to the direction of flow of the gas, and such deposits may attain a magnitude and an extent that the flow conditions in the entire system are altered. In extreme cases, it may even happen that the venturi scrubber is completely blocked. To avoid such deposits and the difficulties which result therefrom, it is already known from U.S. Pat. No. 2,684,836 to provide an annular duct on a vertically disposed venturi scrubber, in the region of the largest diameter of the intake portion; from the annular duct go a plurality of peripherally extending pipe portions out of which a fluid, usually water, passes into the intake portion under a certain pressure, in such a way that the inside wall surface of the intake portion is acted upon by a layer of fluid which is intended to prevent solid particles from being deposited thereon. However, that arrangement does not guarantee that the fluid is uniformly distributed over the inside surface of the intake portion. In particular, adjacent the end of the largest diameter of the intake portion, there are areas which are not wetted by the fluid. A film of fluid that covers the entire wall surface is only formed in the lower region of the intake portion, but there is no guarantee that that film of fluid is fairly uniform at least in regard to its thickness and speed of flow. For that reason, the delivery pipe for the gas to be scrubbed is extended far into the intake portion, in order to ensure that the incoming gas does not impinge on inadequately wetted parts of the wall surface of the intake portion. That considerably increases the axial structural length of the venturi scrubber. Another serious disadvantage is that the fluid has only a small amount of kinetic energy and thus has only a slight flushing effect. That is essentially to be attributed to the fact that the fluid is concentrated at a small number of points as it flows into the interior of the intake portion. In that arrangement, it is necessary to avoid using an excessively high pressure as otherwise there is the risk of turbulence occurring and particles coming out of the flow of fluid, with such particles passing into the free cross-section of the intake portion and there forming deposits on the supply pipe. However, if the pressure used is only slightly increased, the flushing action is inadequate as the fluid loses its swirl action after covering a relatively short distance on the inside wall surface of the intake portion, and simply flows downwardly under the effect of the force of gravity. The flow of speed which is produced in that mode of operation is too low to be able reliably to avoid the formation of deposits. Moreover, the known apparatus probably has to be restricted to a vertical arrangement of the venturi scrubber as if that is not the case the above-mentioned disadvantages are felt even more severely.

U.S. Pat. No. 3,601,374 discloses a venturi scrubber which is also arranged vertically and whose intake portion is provided at the largest-diameter end with an annular duct for a fluid which is connected over its entire periphery to the intake portion duct through which the gas flows. Two feed conduits for the fluid open tangentially into the annular duct. The latter only represents an enlargement in the intake portion. It is completely open at its side which is directed towards the interior of the intake portion so that the fluid which moves in the peripheral direction in the annular duct flows into the intake portion under the effect of the force of gravity, over an edge which separates the annular duct from the inside wall of the intake portion. In this arrangement also the fluid flow speed which comes about essentially only under the effect of the force of gravity is not sufficient to avoid caked-on deposits. An improved flushing action could only be achieved by increasing the amount of flushing water and thus producing a thicker film of water on the inside wall surface of the intake portion. However, that results in an increased level of water consumption. In actual fact, the fluid which is supplied by way of the annular duct in the known apparatus is intended to be picked up in finely divided form by the flow of gas, in order to bind the particles of solid matter in the gas.

The invention is based on the object of so designing a venturi scrubber of the kind set forth in the opening part of this specification, that the disadvantages of known apparatuses are not encountered. In particular, the invention seeks to provide that, with an economical level of consumption of fluid, permanent deposits on the wall of the equipment are reliably avoided, more specifically including when there are fluctuating amounts of gas and fluctuating amounts of solid particles therein. In addition, the invention seeks to provide that the venturi scrubber can be used irrespective of whether it is arranged vertically or horizontally or in some intermediate position. The invention also seeks to provide that the structural length is as short as possible. The design of the venturi scrubber is to be simple and neat.

To achieve that object, the invention proposes that the annular duct which is under an increased pressure is connected by way of a through-flow gap to the duct through which the gas flows and the through-flow gap is directed towards the smallest-diameter end of the intake portion. That configuration provides that the fluid issues into the duct over the entire peripheral area of the flow duct provided within the intake portion for the gas to be cleaned, and, by virtue of being tangentially introduced into the annular duct, also has a certain swirl action, that is to say, a speed component which is directed in the peripheral direction of the inside wall of the intake portion, but at the same time also having an axial component, wherein the speed, in particular also in the axial direction, is adjustable by means of the pressure conditions within the annular duct. A uniform film of fluid which has cohesion over the entire periphery of the arrangement issues from the through-flow gap and extends over the entire length of the intake portion over all regions of the wall of the duct through which the gas flows. In that arrangement, the solid particles which cling to the inside wall surface of the intake portion are flushed away by the flow energy of the fluid so that it is possible to operate with a thin film of fluid which in addition does not have any turbulence and irregularities, as it already issues from the through-flow gap in the direction in which the gas is flowing. A non-turbulent and regular thin film of fluid is achieved in a particularly advantageous manner if the through-flap gap is arranged to be directed substantially parallel to the adjoining region of the inside wall of the intake portion. In that connection, the arrangement is advantageously such that the through-flow gap is defined on its outward side by the inside wall surface of the intake portion so that the film of fluid, while it is still within the through-flap gap, is in close contact with the inside wall surface that defines the gas flow duct and along which it is to flow towards the smallest-diameter end of the intake portion.

In order to provide a simple and operationally reliable construction, the annular duct and the through-flap gap are advantageously delimited by a ring which can be axially screwed into the intake portion. That kind of design also affords the possibility of easily adjusting the through-flow gap in regard to its width. For that purpose, the ring is screwed into the screwthread on the intake portion to a greater or lesser depth, according to the respective operating conditions involved. Different operating conditions occur for example in regard to different amounts of gas and different dusts, both in respect of grain size and also in respect of the nature of the dust and also in regard to the respective conditions of the gas in respect of pressure, temperature and flow speed. For scrubbing for example gas produced in a Winkler gasifier by means of the gasification of lignite or brown coal, it has been found desirable for the through-flow gap to be adjusted to a width of from 0.1 to 1 mm, preferably about 0.5 mm. A construction which has been found to be particularly advantageous is one in which the through-flow gap is defined by the region of the ring of smallest outside diameter and the region of the intake portion of largest inside diameter. In that arrangement, it is readily possible for the two wall portions of the ring on the one hand and the intake portion on the other hand, being the wall portions which define the through-flow gap at the discharge side thereof, to extend substantially parallel to each other. That also contributes to the fluid issuing from the through-flow gap in a uniform manner and without substantial turbulence, so that the film of fluid which covers the inside wall surface of the duct through which the gas flows is also uniform and can thus be thin, while however covering the entire inside wall surface of the duct.

In accordance with a further proposal of the present invention, the smallest diameter of the internal cross-section, through which the gas flows, of the ring, may be somewhat smaller than the largest diameter of the wall of the duct through which the gas flows in the intake portion. In that arrangement, it is desirable for the internal cross-section of the ring, through which the gas flows, to be of a diameter which progressively decreases in the direction of flow. In that arrangement, the gas flows through the ring into the duct of the actual intake portion. Due to the inside diameter of the ring decreasing in the direction of flow, the flow of gas experiences a first, locally limited acceleration effect. That influences the flow pattern of the gas flow in such a way that the boundary layer which is otherwise formed in flows in the vicinity of the wall and which possibly moves in the opposite direction to the actual direction of gas flow is interrupted. As the usual, generally laminar boundary layer also promotes the depositing of solid particles and thus the formation of caked-on deposits, the configuration in accordance with the invention contributes to preventing deposits upstream of the through-flow gap in the direction of gas flow.

An embodiment of the invention is illustrated in the drawings in which.

Figure 1:
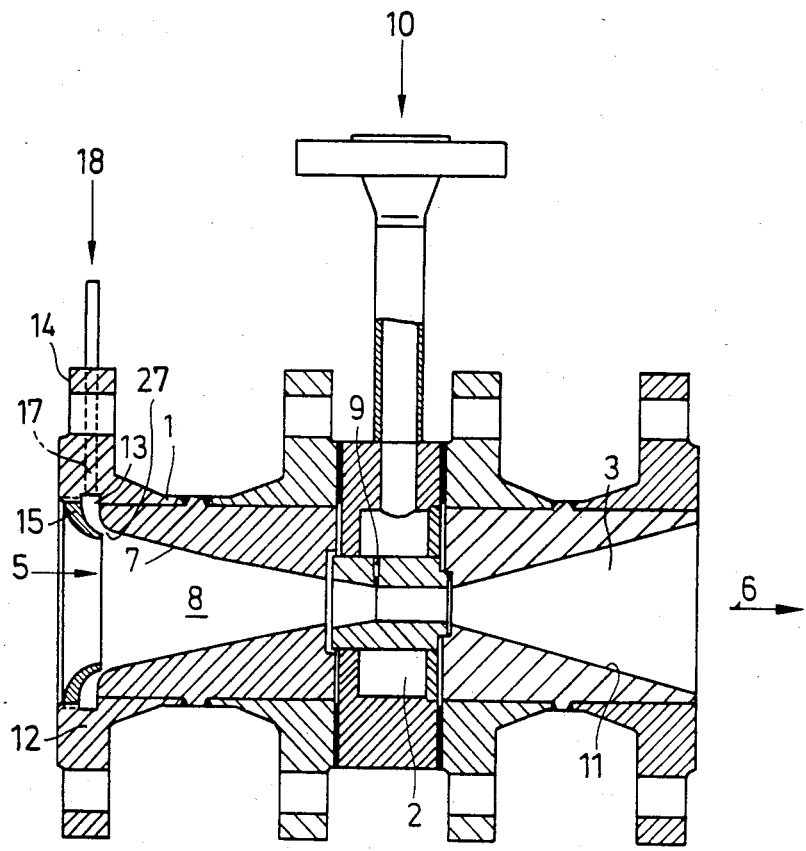
FIG. 1 shows a view in longitudinal section of a venturi scrubber.
Figure 2:
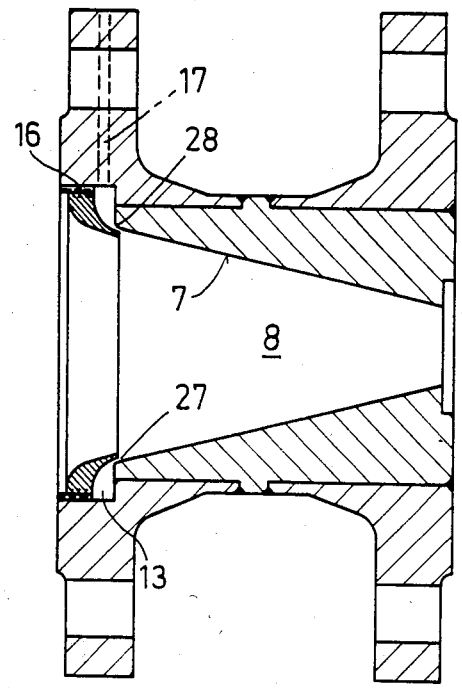
FIG. 2 shows a view in longitudinal section on a larger scale of the intake portion of the venturi scrubber.
Figure 4:
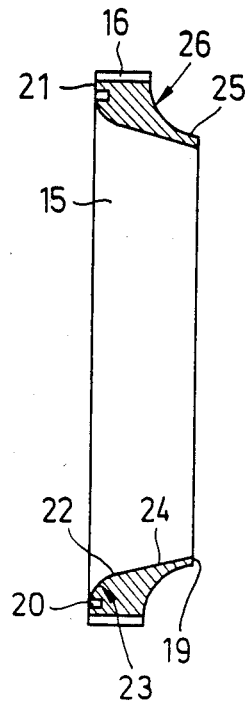
FIG. 4 shows a view in longitudinal section on an enlarged scale of the ring defining the through-flow gap.
Figure 3:
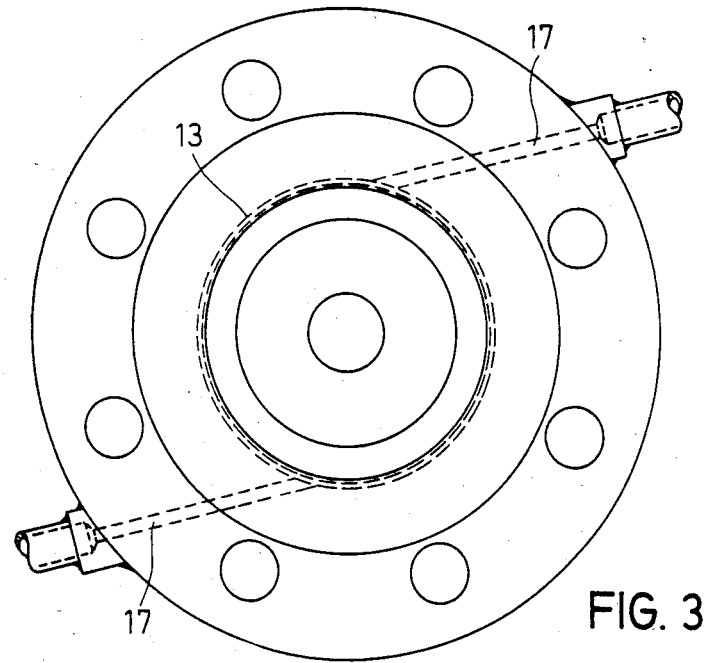
FIG. 3 shows a front view of the intake portion as viewing in the direction of flow.

The venturi scrubber illustrated in the drawings comprises an intake portion 1, a central portion 2 and a diffuser 3. That sequence of components corresponds to the direction of flow of the gas which flows into the scrubber in the direction indicated by the arrow 5 and leaves the scrubber again in the direction indicated by the arrow 6.

The inside wall surface 7 of the intake portion 1 defines a duct 8 which progressively decreases in the flow direction 5, 6. The central portion 2 has the smallest flow cross-section. Disposed directly in front of the smallest flow cross-section of the central portion 2 are radial bores 9 by way of which a fluid scrubbing agent, generally water, is introduced into the cross-section of the central portion 2, through which the gas flows. The water is supplied by way of a pipe connection 10.

Adjoining the central portion 2 downstream thereof in the direction of flow is the diffuser 3, the wall 11 of which progressively enlarges in the direction of flow. At the narrowest point in the central portion 2, the gas reaches its maximum flow speed which, in the diffuser 3, in accordance with the increase in cross-section thereof, is again reduced to a value which approximately corresponds to the speed at which the gas passes into the intake portion.

The caking and deposits which are to be eliminated are produced, if no special precautions are taken, just upstream, as viewed in the direction of flow 5, 6, of the region at which the scrubbing fluid passes into the internal cross-section of the central portion 2 through the bores 9. When that occurs, the deposits grow along the wall surface 7 of the duct 8 in opposition to the flow direction 5, 6 and into the intake portion 1, whereby the flow conditions are changed and at least the mode of operation of the venturi scrubber is severely adversely affected.

To overcome such difficulties, disposed adjoining the end 12 of the largest cross-section of the intake portion 1 is an annular duct 13 which extends with its outer periphery into the fixing flange 14. Inwardly the annular duct 13 is defined by a ring 15 which is axially screwed into the intake portion 1 or the flange 14, by way of a fine screwthread 16. At the outside periphery of the annular duct, at least two feed ducts 17 for a fluid, preferably water, open approximately tangentially into the annular duct so that the fluid within the annular duct has a large component of movement in the peripheral direction thereof.

The ring 15 which defines the annular duct at the inward side thereof comprises an annular member which carries a fine screwthread 16 on its outer periphery. The annular member also has small bores 20 for receiving a tool with which the ring 15 can be screwed into the intake portion 1. The front end face 21, which faces in the opposite direction to the direction of flow 5, 6, merges into a conically extending peripheral surface 24, by way of a region 22 which is rounded off with a large radius at 23. The angle of inclination of the surface 24 is for example 15° and advantageously corresponds to the angle of inclination at least of the adjoining region of the wall surface 7 of the duct 8. That arrangement which provides for matching of the intake flow cross-sections by way of conical surfaces at the same angles of inclination provides, in the intake portion 1, gas flow conditions which are free or almost free of turbulence.

At its region which is towards the central portion 2, the outside peripheral surface 25 of the ring 15 has a diameter which decreases in the direction of flow, in such a way that in longitudinal section it is convexly rounded off, with a large radius 26. The region of the peripheral surface 25 which is towards the cylindrical part of the ring 15, being the part provided with the screwthread 16, serves as an internal boundary for the annular duct 13 which goes into a through-flow gap 27 at its region which is towards the rearward face or edge 19 of the ring 15. The gap 27 is defined on its outward side by the largest-diameter region of the wall 7 of the duct 8. The fluid passes through the gap 27 into the duct 8 in the intake portion 1, more specifically in the form of a thin film of fluid which covers the wall 7 of the duct 8. In that arrangement, the region of the surface 25 which is towards the end face 19 extends substantially parallel to the oppositely disposed region of the wall 7 of the duct 8 so that the fluid that issues from the gap 27 has a component of movement that is substantially parallel to the lengthwise extent of the wall 7 and which results in a uniform flow and distribution of the resulting film of fluid which rotates along the wall 7 and at the same time moves towards the central portion 2.

The water which issues from the gap 27 under a certain increased pressure and at comparatively high speed flushes away solid particles which have formed a deposit on the wall 7 of the duct 8 thereby reliably eliminating caking thereon.

The width of the annular gap may be for example 0.5 mm, with a diameter of 70 mm. In that case, 100 liters/minute of water are required for forming the film of fluid that flows along the wall surface 7 of the duct 8, while about 300 liters/minute are introduced into the central portion 2, for scrubbing the gas. The axial length of the intake portion is for example 110 mm and its maximum and minimum cross-sections are 70 and 23 mm respectively. The amount of gas scrubbed may be on average for example of the order of magnitude of 5 m$^3$/minute.

The wall 7 has a cone angle of the order of magnitude of 10°. The intake portion 1 may also be of such a configuration that the region which is towards its maximum-diameter end 12 is at an angle of about 15°. That possibility is shown in FIG. 1 of the drawings.

Because the film of fluid on the wall surface 7 is very thin and uniform, it is not broken up either by the gas flowing in the duct 8 or by the particles of dust entrained therewith. On the contrary, it contributes to substantially reducing the friction between the gas and the wall surface 7, so that there is a lower pressure drop in the gas.

We claim:

1. A venturi scrubber for dust-laden flowing gases comprising:
   an intake portion having a duct through which the gas flows, said duct through said intake portion having a cross-section that progressively decreases in the gas flow direction, said intake portion having a plurality of inlet conduits, said conduits tangentially intersecting the periphery of the largest cross-section of said intake portion;
   a central portion having a duct through which the gas flows, said duct through said central portion having a first portion having a cross-section that progressively decreases in the gas flow direction, the largest cross-section of the first portion being adjacent and coaxial to the smallest cross-section of said duct through said intake portion, said duct through said central portion having a second portion having a cross-section that is constant, said second portion being coaxial with said first portion, said central portion having a plurality of radial bores therethrough, said bores intersecting said duct through said central portion at the junction of the first and second portions, whereby a first liquid being introduced into said duct through said central portion by said bores removes the dust in the gas;
   a diffuser having a duct through which the gas flows, said duct of the diffuser having a cross-section which progressively increases in the direction of the gas flow, the smallest cross-section of the duct of the diffuser being adjacent to and coaxial with said second portion of said central portion;

a ring being adjacent the largest cross-section of said intake portion, a part of said ring and a part of said intake portion defining an annular duct therebetween, said annular duct extending along the entire periphery of said intake portion, a wall of said ring being parallel to a wall of said duct of said intake portion, whereby a second fluid being introduced into said annular duct from said inlet conduits, and said second fluid being under pressure; and said ring and a wall of said duct of said intake portion defining a flow-through gap, said gap being perpendicular to said inner surface of said duct through said intake portion, whereby said second fluid exiting said annular duct through said gap, said second fluid forming a uniform thin film of the fluid around an inner surface of said duct through said intake portion, said second fluid adapted to remove any deposits of dust from the inner surface of the duct through said intake portion.

2. A venturi scrubber according to claim 1 characterised in that the annular duct (13) and the through-flow gap (27) are defined by a ring (15) which can be axially screwed into the intake portion (1).

3. A venturi scrubber according to claim 2 characterised in that the through-flow gap (27) is adjustable in respect of its width.

4. A venturi scrubber according to claim 2 characterised in that the through-flow gap (27) is defined by the region of the ring (15) of the smallest outside diameter and by the region of the intake portion (1) of largest inside diameter.

5. A venturi scrubber according to claim 1 characterised in that the two wall regions, that define the through-flow gap (27), of the ring (15) on the one hand and theintake portion (1) on the other hand, extend substantially parallel relative to each other.

6. A venturi scrubber according to claim 1 characterised in that the smallest diameter of the internal cross-section of the ring (15), through which the gas flows, is somewhat smaller than the largest diameter of the duct (8) in the intake portion (1), through which the gas flows.

7. A venturi scrubber according to claim 1 characterised in that the internal cross-section of the ring (15), through which the gas flows, is of a diameter that progressively decreases in the direction of flow.

8. A venturi scrubber according to claim 1 characterised in that the portion of the ring (15), which is towards the smallest-diameter region of the intake portion (1), is provided externally with a progressively tapering peripheral surface which defines the annular duct (13) and the through-flow gap (27).

* * * * *